April 1 1958     J. S. SENKEWITZ     2,828,542

PEELER

Filed June 7, 1955

INVENTOR

JOHN S. SENKEWITZ

BY *Townsend & Beaman*

ATTORNEY

United States Patent Office 2,828,542
Patented Apr. 1, 1958

2,828,542

PEELER

John S. Senkewitz, Brooklyn, Mich., assignor to S & S Industrial Products, Brooklyn, Mich., a corporation of Michigan Application June 7, 1955, Serial No. 513,778

10 Claims. (Cl. 30—283)

The present invention relates to kitchen utensils, and more particularly to paring and slicing implements adapted to pare or slice vegetables or the like.

Heretofore, the art has endeavored to provide paring and slicing implements which would produce slices of food of uniform thickness despite surface irregularities on the piece of food being sliced. It was ordinarily impossible for a food handler of average skill to produce uniform slices of food by means of an ordinary paring or kitchen knife. If the food handler sought to produce nicely graded slices, he was obliged to work very slowly and carefully and thus consume a great deal of time. If on the other hand he worked rapidly, it often resulted that the slices produced were rough and irregular as to thickness and shape, so that the produce was unsightly and did not lend itself to efficient cooking.

Hence, at an early date, it was proposed to provide gage knives as in Conover Patent No. 417,859, December 24, 1889. Knives of this type operated on the principle of the spoke shave known to carpenters, and comprised an implement on which a knife element was selectively positionable relative to the gage comprising the major portion of the implement, so as to vary the distance of the gage and the knife edge and thus to vary the thickness of the slice of food obtained. However, knives of this type had several serious drawbacks, the first being that the implements had to be turned in the hand of the user so as to follow every contour of the food being sliced, and the second being that the knife blade was angularly disposed relative to the main portion of the implement, so that the proper inclination of the implement relative to the food being sliced could not easily be determined by the eye.

Thus, at a later date, it was proposed to mount the gage bar adjustably on the knife blade itself, so that the user could observe the position of the knife blade and thus determine the proper angle at which to dispose the implement. However, knives of this type, as disclosed for example in Patent No. 2,164,117 to W. J. Mack, June 27, 1939, still suffered from the great disadvantage that they must be turned in the hand of the user to follow all the contours of the item of food being sliced.

Finally, in Ferrin Patent No. 2,645,851, July 21, 1953, it was proposed to provide a paring implement which would overcome the latter difficulty recited above. To this end, it was proposed to mount the cutting blade for limited pivotal movement so that it would adjust to the varying contours of the item of food being sliced. However, it was found that with the cutting blade pivotally mounted and the gage bar relatively fixedly mounted as in the device of this patent, any pivotal movement of the knife blade would move the knife edge relative to the gage bar and thus vary the thickness of the slices being cut. The result was very little better than what could be produced with a paring knife.

Although many attempts were made to overcome the foregoing difficulties and other disadvantages, none, as far as I am aware, was entirely successful when carried into practice commercially on an industrial scale.

Accordingly, it is an object of the present invention to provide a paring and slicing implement which will easily follow the contours of the object to be sliced and will at the same time maintain uniform depth of slice Another object of the invention is to provide a paring and slicing implement which is readily adjustable to any of a plurality of depths of slice.

The invention also contemplates providing a paring and slicing implement in which the operative parts are adjustable so as to permit slicing in any direction.

Finally, the invention further contemplates providing a paring and slicing implement which will be simple and inexpensive to manufacture, easy to assemble and operate, and rugged and durable in use.

Other objects and advantages will become apparent from the following description taken in conjunction with the accompanying drawings, in which.

Figure 1:
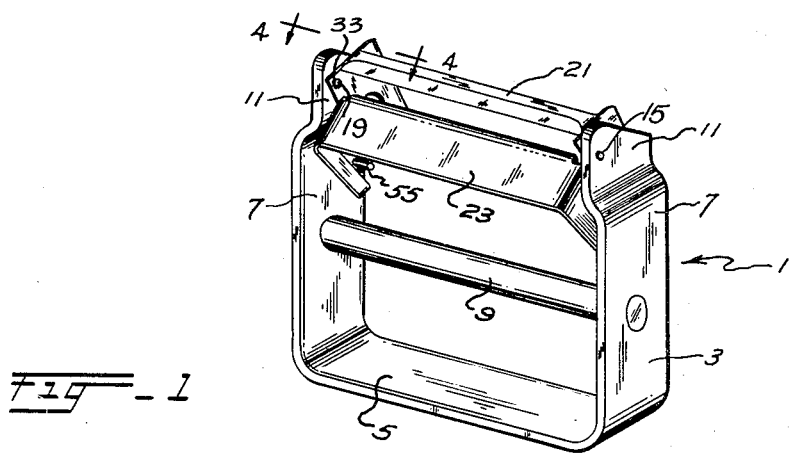
Figure 1 is a perspective view of a novel paring and slicing implement according to my invention, with the operative parts in one operative position.

Referring now to the drawings in greater detail, I have shown a paring and slicing implement generally designated as 1 and including a handle frame 3 of generally U-shaped configuration. A hand grip 5 is provided by a medial portion of the frame and bears at either end a pair of laterally offset resilient arms 7. A bracing and guard bar 9 is mounted between arms 7 intermediate their length; and the arms terminate in inwardly offset free ends 11 which bear between them the working parts of the implement, to be described. The inward offset of free ends 11 enables the use of working parts of a length shorter than would be suitable for the length of hand grip 5.

Figure 4:
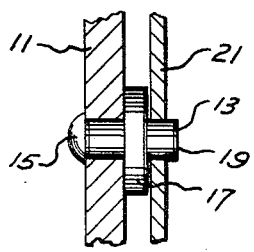
Figure 4 is a fragmentary cross-sectional view taken on the line 4—4 of Figure 1.

As best shown in Figure 4, each free end 11 is provided with an inwardly directed rivet or stud 13 having an offset head 15 in contact with the outer side of free end 11 so as to retain it against inward movement and a washer ring 17 fixed to stud 13, so as to fix the stud against outward movement. Stud 13 terminates in an inwardly projecting free end 19. Between them, opposed aligned studs 13 mount the working parts of the implement, comprising elongated cutting blade 21 and elongated depth gage or gage bar 23.

Figures 2, 3:
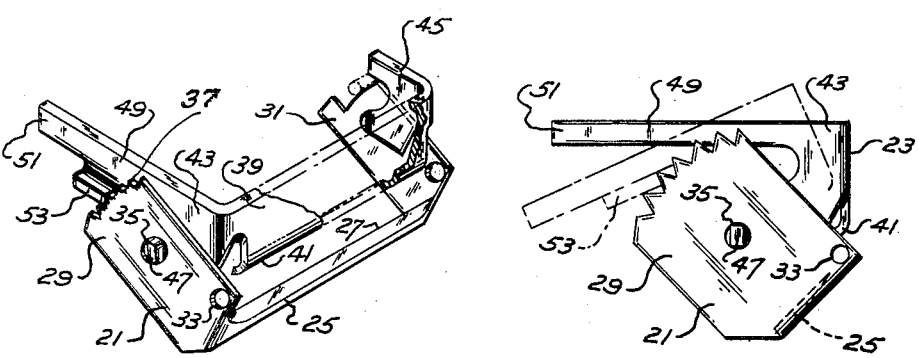
Figure 2 shows a perspective view, with parts broken away, of the assembly of gage bar and cutting blade of an implement according to my invention.
Figure 3 is an end elevational view of the subassembly of Figure 2.

Cutting blade 21 is perhaps best illustrated in Figure 2, and is there seen to comprise an elongated medial blade portion 25 bearing at one side a sharp cutting edge 27. Blade 21 is provided at either end with a laterally offset flange 29 or 31, each of which is provided with one of a pair of aligned holes 33 engageable about studs 13 to mount the blade for pivotal movement about the axis defined between studs 13. A second pair of aligned holes 35 is provided in flanges 29 and 31; and flange 29 is provided with a plurality of notches in its outer end disposed in an arc of which the center of curvature coincides with the axis of aligned holes 35.

Gage bar 23 comprises a flat medial portion 39 having a curved edge 41 on the side thereof facing the blade 21 and turned away therefrom. At either end of portion 39, gage bar 23 is provided with laterally offset flanges 43 and 45 bearing on their outer faces outwardly extending aligned nipples or studs 47 receivable in aligned holes 35 of cutting blade 21. Laterally offset from one end of medial portion 39 is a resilient lever 49 terminating laterally in a free end 51 and bearing an outwardly extending detent or lug 53 spaced inwardly from free end 51.

For the purpose of preventing unlimited pivotal movement of the assembly of cutting blade 21 and gage bar 23 in either direction, a detent or stop 55 is set in free ends 11 to project inwardly therefrom and contact blade 21 or bar 23.

The operation of my novel implement is as follows:

In use, the implement is held by hand grip 5, as shown for example in Figure 1. The depth to which the implement will slice is determined by the spacing between blade 21 and gage bar 23. This distance is adjustable by manipulation of a portion of bar 23. Thus, by pressing inward on free end 51 of resilient lever 49, lug 53 will be moved inwardly of flange 29 and will thus disengage from its associated notch 37. Bar 23 may then be pivotally adjusted about stud 47 relative to blade 21. By this adjustment, medial portion 39 of bar 23 will be moved nearer to or farther from cutting edge 27. When resilient lever 49 is finally released, lug 53 will enter the next adjacent notch 37; and the spacing between portion 29 and cutting edge 27 will be fixed. Thus, although the assembly of blade 21 and bar 23 pivots as a whole about studs 13, the individual elements of the assembly remain fixed relative to each other in use.

If it is desired to remove the various parts of the implement for repair or replacement, or if it is desired to sharpen the cutting blade, it is necessary merely to spread apart free ends 11 of resilient arms 7, thereby to disengage studs 13 from holes 33 and permit removal of the subassembly from the handle frame. Similarly, gage bar 23 has sufficient resiliency to permit disengagement of it from cutting blade 21 merely by pressing in free end 51 of resilient lever 49 to a degree greater than would be necessary merely to disengage lug 53 from a notch 37. Alternatively, flanges 29 and 31 may be pulled in opposite directions; but in either event, it results that studs 47 are withdrawn from their seats in holes 35 thereby to permit disengagement of blade 21 and bar 23. Needless to say, assembly of the implement may be by the reverse of the aforesaid process.

It is particularly to be noted that flanges 29 and 31 of cutting blade 21 are journaled for rotation between free ends 11 of arms 7, and that blade 21 is thus pivotally mounted about a first axis running generally parallel to blade portion 25. It is also to be noted that gage bar 23 is journaled for rotation in flanges 29 and 31 about a second axis which is parallel to the first axis, and that medial portion 39 of bar 23 is disposed generally parallel to this second axis about which it rotates. It should also be noted that flanges 29 and 31 are disposed between free ends 11, and that flanges 43 and 45, in turn, are disposed between flanges 29 and 31.

Hence, it will be seen that when my novel paring and slicing implement is used, it will follow the contours of the vegetable to be sliced by virtue of the fact that the entire assembly of working parts will pivot together about the axis defined by studs 13. At the same time, it will be noted that the depth of cut will remain constant, since the cutting edge and gage bar remain fixed relative to each other during use.

Finally, it should be noted that it is obvious from the above disclosure that I have provided a paring and slicing implement which is simple and inexpensive in manufacture, easy to use, and rugged and durable in use.

Thus, it will be seen, that I have achieved all of the objects of my invention as previously set forth.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A paring and slicing implement for vegetables and the like comprising a handle frame, a cutting blade member having a straight cutting edge and a depth gage member parallel to said edge, one of said members being pivotally mounted on said handle frame, and the other of said members being pivotally mounted on said one member, said members being pivotal about axes parallel to said edge.

2. A paring and slicing implement for vegetables and the like comprising a handle frame, a cutting blade member having a straight cutting edge and a depth gage member parallel to said edge, one of said members being pivotally mounted on said handle frame about an axis parallel to said edge, and the other of said members being pivotally mounted on said one member, and detent means on each of said members coacting to maintain said other member in any of a plurality of positions of adjustment relative to said one member.

3. A paring and slicing implement for vegetables and the like comprising a handle frame, a cutting blade member having a straight cutting edge and a depth gage member parallel to said edge, one of said members being pivotally mounted on said handle frame about an axis parallel to said edge, and the other of said members being pivotally mounted on said one member, and detent means on said handle frame engageable with one of said members to limit pivotal movement of said members in either direction.

4. A paring and slicing instrument comprising a handle frame, a cutting blade having a straight cutting edge pivotally mounted on said handle frame, and a depth gage parallel to said edge pivotally mounted on said cutting blade, said blade and gage being pivotal around axes parallel to said edge.

5. A paring and slicing implement for vegetables and the like comprising a handle frame, a cutting blade having a straight cutting edge pivotally mounted on said handle frame, a depth gage parallel to said edge pivotally mounted on said cutting blade, said blade and gage being pivotal around axes parallel to said edge, and detent means on said gage and blade coacting to maintain said gage in any of a plurality of positions of adjustment relative to said blade.

6. A paring and slicing implement for vegetables and the like comprising a handle frame, a cutting blade member having a straight cutting edge pivotally mounted on said handle frame, a depth gage member parallel to said edge pivotally mounted on said cutting blade member said blade and gage being pivotal around axes parallel to said edge, and detent means on said handle frame engageable with one of said members to limit pivotal movement of said members in either direction.

7. A paring and slicing implement for vegetables and the like comprising a U-shaped handle frame, an elongated cutting bar having offset flanges at either end pivotally mounted between the arms of said handle frame, and an elongated gage bar pivotally mounted on said flanges.

8. A paring and slicing implement for vegetables and the like comprising a handle frame, an elongated cutting bar having first offset flanges at either end thereof, said flanges being journaled in said handle frame for pivotal movement about a first axis, and an elongated gage bar having second offset flanges at either end thereof, said second flanges being journaled in said first flanges for pivotal movement about a second axis parallel to said first axis.

9. A paring and slicing implement for vegetables and the like as in claim 8, and detent means on each of an adjacent first and second flange coacting to maintain said gage bar in any of a plurality of positions of adjustment relative to said cutting bar.

10. A paring and slicing implement for vegetables and the like as in claim 8, in which said second flanges are disposed between said first flanges.

References Cited in the file of this patent
UNITED STATES PATENTS

| | | |
|---|---|---|
| 740,556 | Guinan | Oct. 6, 1903 |
| 953,989 | Durham | Apr. 5, 1910 |
| 2,099,605 | Hanson | Nov. 16, 1937 |
| 2,645,851 | Ferrin | July 21, 1953 |